3,231,612
ARALKYLTHIOALKYL AMINO ALCOHOLS
Morton H. Gollis, Brookline, John C. James, Melrose, and Robert J. Wineman, Concord, Mass., assignors to Monsanto Research Corporation, St. Louis, Mo., a corporation of Delaware
No Drawing. Filed Feb. 28, 1962, Ser. No. 176,406
11 Claims. (Cl. 260—570.5)

This invention relates to new chemical compounds, and more particularly, provides novel (aralkylthio)alkylaminoalkanols with an internally positioned hydroxylated carbon atom.

Alkanols having an internally positioned hydroxylated carbon atom differ significantly from primary alkanols in that the carbon atoms can be asymmetric and hence optically active. Biological systems very frequently involve optically active compounds, and display marked sensitivity to particular optical configurations of such compounds.

An object of this invention is to provide novel compounds with an alkanol configuration having an internally positioned hydroxylated carbon atom.

A particular object of this invention is to provide novel (aralkylthio)alkylaminoalkanols having an internally positioned hydroxylated carbon atom.

These and other objects will become evident from a consideration of the following specification and claims.

In accordance with this invention, there are provided novel (aralkylthio)alkylaminoalkanols of the formula

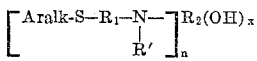

where each R is saturated aliphatic hydrocarbon,

R' is selected from the group consisting of hydrogen and saturated aliphatic hydrocarbon, Aralk is an aralkyl hydrocarbon radical consisting of saturated aliphatic hydrocarbon substituted by a benzenoid ring, $n$ is an integer of from 1 to 2, $x$ is an integer of from 1 to 3, and at least one of the hydroxylated carbon atoms of the radical $R_2$ is internally positioned.

By each R is meant each of $R_1$ and $R_2$. By a benzenoid ring is meant phenyl or alkylphenyl such as tolyl. In the compounds of the invention, each hydrocarbon radical may contain up to 12 carbon atoms. The compounds in which each saturated aliphatic hydrocarbon radical is lower aliphatic, containing up to six carbon atoms, are preferred. For stability, at least two carbon atoms should intervene between an amine nitrogen atom and other hetero atoms (non-carbon atoms such as O and S), and the 2-thioalkyl and 3-thioalkyl compounds are preferred. An especially preferred group comprises the compounds in which the nitrogen atom is beta to each of a sulfur-substituted carbon atom and an oxygen-substituted carbon atom. Aralkyl is preferably 1-arylalkyl, and most preferably benzyl.

As illustrative of the compounds provided by this invention may be mentioned, as a first class, those wherein the alkanol radical is an acyclic monohydric alkanol such as for example, 1-([2-(benzylthio)ethyl]amino)-2-propanol, 1-([2-(benzylthio)propyl]amino)-2-propanol, 1-([3-(benzylthio)-propyl]amino)-2-propanol, 1-([2-(benzylthio)ethyl]methylamino)-2-butanol, 1-([2-(benzylthio)-2-ethylpropyl]amino) - 3-butanol, 1-([3-(benzylthio)-1-methylethyl]amino) - 3-butanol, 1-([2-(benzylthio)butyl]propylamino) - 2-propanol, 1-[2-(1-phenethylthio)-n-hexyl]amino) - 3-butanol, 1-([2-(benzylthio)ethyl]amino)-4-hexanol, 1-([2-(2-phenethylthio)ethyl]amino) - 2-methyl-2-butanol, 1-([2-(benzylthio)propyl]amino) - 2-methyl - 3-butanol, 1-([2-(benzylthio)butyl]amino) - 2-methyl - 2-propanol, 1-([2-(benzylthio) - 1-propylnonyl]amino) - 2-propanol, 1-([2-(benzylthio)ethyl]amino)-1,4-diethyl-2-octanol, and so forth.

The invention also includes cyclic alkanols, illustrative of the monohydric embodiment of which are, for example, 2 - ([2-(benzylthio)ethyl]amino)cyclohexanol, 2 - ([3-(benzylthio)propyl]amino)cyclohexanol, 2-([2-(1-phenylbutylthio)ethyl]amino)cyclohexanol, 2 - ([2 - (benzylthio)propyl]-methylamino)cyclopentanol, 2-([2-(benzylthio)hexyl]amino)-3-methylcyclohexanol, 2-([2-(benzylthio)ethyl]amino)-4-methyl-cyclohexanol, and the like.

The invention also includes polyfunctional compounds, and in this connection there are included compounds containing more than one hydroxyl function and compounds containing more than one (aralkylthio) alkylamino radical.

Thus, the invention provides mono-[(aralkylthio)-alkylamino]alkanepolyols such as 3 - ([2 - (benzylthio)ethyl]amino) - 1,2-propanediol, 3 - ([3-(benzylthio)propyl]amino)-1,2-propanediol, 3-([2-(benzylthio)-1-methylpropyl]amino) - 1,2-propanediol, 2([2-(benzylthio)ethyl]amino)-1,3-butanediol,2-([2-benzylthio)ethyl]amino)-1,4-butanediol, 4-([2-(benzylthio)ethyl]amino) - 1,3-cyclohexanediol, 4-([3-(benzylthio)propyl]butylamino)-1,3-cyclohexanediol, 3-([2-(benzylthio)ethyl]methylamino)-1,2-propanediol, 3-([3-(benzylthio)propyl]propylamino)-1,2-propanediol, 2-([2-(benzylthio)ethyl]amino) - 1,3,4-butanetriol, and so forth.

Another group falling within the class of the (aralkylthio) alkylamino alkanols in which at least one of the hydroxy function and the substituted-amino function is repeated comprises bis[(aralkylthio)amino] monohydric alkanols. These are illustrated by 1,3-bis([2-(benzylthio)ethyl]amino) - 2 - propanol, 1,3-bis([3 - (benzylthio)propyl]amino)-2-propanol, 1,3 - bis([2 - (benzylthio)ethyl]methylamino)-2-propanol, 1,3-bis([2-(benzylthio)-1-ethylpropylamino)-2-propanol, 1,3-bis([2 - benzylthio) - 1 - ethylbutyl]amino)-2-propanol, 2,3-bis([2-(benzylthio)ethyl] amino)-1-butanol, and the like.

Still another embodiment of this aspect of the invention comprises bis([(aralkylthio)alkyl]amino)alkanepolyols such as
1,4-bis([2-benzylthio)ethyl]amino)-2,3-butanediol
1,4-bis([3-(benzylthio)propyl]amino)-2,3-butanediol
1,4-bis([2-benzylthio)propyl]methylamino)-2,3-butanediol
1,4-bis([2-(benzylthio)butyl]amino)-2,3-butanediol
1,4-bis([1-(benzylthio)-2-hexyl]amino)-2,3-butanediol
1,4-bis([6-(benzylthio)hexyl]amino)-2,3-butanediol
1,4-bis([2-(benzylthio)ethyl]amino)-2,3-dimethyl-2,3-butanediol
1,6-bis([2-(benzylthio)ethyl]amino)-2,5-hexanediol, and the like; and
bis([(aralkylthio)alkyl]amino)cycloalkanepolyols such as
2,3-bis([2-(benzylthio)ethyl]amino)-1,4-cyclohexanediol
2,4-bis([2-(benzylthio)ethyl]amino)-1,5-cyclohexanediol
2,3-bis([3-benzylthio)propyl]methylamino)-1,4-cyclohexanediol
2,3-bis([2-(benzylthio)ethyl]amino)-4-butyl-5-ethyl-1,4-cyclohexanediol, and so forth.

A preferred method of making members of the stated class of compounds consists in opening the ring of a vic-epoxy alkane in reaction with an aralkylthioalkylamine. The method can be illustrated, for example, by reference to the reaction of propylene oxide with an aralkylthioalkylamine, as shown in the following equation:

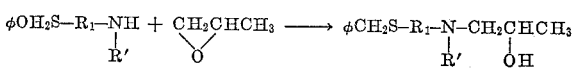

where $R_1$ and $R'$ are as defined above and $\phi CH_2$ is the benzyl radical. It has been established that the epoxy ring opens at the least substituted carbon atom, so that epoxides such as 1,2-epoxypropane can be employed to produce a secondary alkanol, having an internally positioned hydroxylated carbon atom. Polyols of the present invention can be produced, for example, by employing a diepoxy alkane such as butadiene diepoxide, or an epoxyalkanol such as glycidol.

Thus, presently useful epoxides comprise vic-epoxyalkanes such as propylene oxide, 1,2-butylene oxide, 2,3-butylene oxide, 2-methylpropylene oxide, 2-methyl-1,2-pentylene oxide, cyclohexene oxide, butadiene diepoxide, 2,3:4,5-diepoxyhexane, 1,2:3,4-diepoxycyclohexane, 2,3-epoxy-1-propanol, 3,4-epoxy-1-butanol, and the like.

The aralkylthioalkyl amines with which the epoxy compounds may be reacted in making the presently provided compounds are aralkylthioalkylamines wherein alkyl is saturated aliphatic hydrocarbon, the amino nitrogen atom carries at least one hydrogen substituent, and any N substitutent other than H is saturated aliphatic hydrocarbon. Thus, useful amines include, for example, 2-(benzylthio)ethylamine, 2-(benzylthio)-N-methylethylamine, 2-(benzylthio)-N-ethylethylamine, 2-(benzylthio)-N-propylethylamine, 2-(benzylthio)-1- propylamine, 2-(benzylthio)-1-butylamine, 2-(benzylthio)-1-propyl-1-nonylamine, 3-(benzylthio)-N-cyclohexyl-1-propylamine, 2-(tolylmethylthio)-ethylamine, and so forth.

The conditions for conducting the stated ring-opening reaction may consist merely of contacting the epoxy compound with the amine. Reaction tends to be immediate and vigorous. The temperature may range from above freezing to below the decomposition temperature of the reaction mixture components, broadly; more particularly, holding the reaction temperature at 50–100° C. is favorable. The reaction may be exothermic, and dropwise addition of the cyclic compound to the reaction mixture is usually preferable. Generally, not more than about one equivalent of the epoxy compound will be introduced per equivalent of amine, where an equivalent is one mole divided by the number of reactive epoxy and amine groups, respectively; and less may be used, when incomplete conversion is acceptable. Solvents and diluents are desirable, and useful solvents and diluents include, for example, hydrocarbons such as benzene and hexane; ethers such as diethyl ether and dioxane; alcohols such as methanol and ethanol, and so forth. Maintaining an atmosphere of nitrogen over the reaction mixture is useful to prevent access of air. Atmospheric pressures are suitable, though variation of pressure above and below atmospheric may be employed if desired.

Another method of preparation of compounds of the presently provided class consists in condensation of a benzyl haloalkyl sulfide with an aminoalkanol having at least one free amine hydrogen substituent and at least one of the hydroxylated carbon atoms of which is internally positioned The condensation releases hydrogen halide to produce the (aralkylthio alkyl)aminoalkanols of this invention.

Useful benzyl haloalkyl sulfides include, for example, bromides, chlorides and iodides such as benzyl 3-chloropropyl sulfide, benzyl 3-bromopropyl sulfide, benzyl 3-iodobutyl sulfide, benzyl 2-chlorobutyl sulfide, benzyl 2-chloropropyl sulfide, 1-phenethyl 3-chloropropyl sulfide, (amylphenyl)methyl 3-chloropropyl sulfide, and so forth. Useful aminoalkanols include, for example 1-amino-2-propanol, 1-amino-2-butanol, 1-amino-3-butanol, 1-amino-2-methyl-2-propanol, 1-amino-3-methyl-2-butanol, 1-methylamino-3-methyl-3-butanol, 2-amino-3-butanol, 2-amino-3-hexanol, 3-amino-1,2-propanediol, 2-amino-1,3-butanediol, 3-amino-1,2,4-butanetriol, 1,4-diamino-2,3-butanediol, 1,4-diamino-2,3-dimethyl-2,3-butanediol, 1,6-diamino-3,4-hexanediol, 2-aminocyclohexanol, 2-aminocyclopentanol, 4,6-diamino-1,2-cyclohexanediol, and so forth.

Conditions for prepartion of the compounds of the present invention by the condensation reaction may comprise merely contacting the halide with the amine. Their ratios may be about that of a 1:1 equivalency, calculated on the number of reactive halogen atoms and amine radicals they respectively contain; or an excess of either may be used. Acid is released by the condensation reaction, and desirably the halide and amine are contacted in the presence of a base. Useful bases are salts containing oxygen in the anion including hydroxides such as KOH, oxides such as lime, carbonates such as sodium carbonate, tertiary amines like triethylamine and pyridine, and so forth. The amount of base used will generally be approximately the calculated quantity needed to neutralize acid released, but more, such as up to 5 times the theoretical equivalent, may be used if desired.

As to the other conditions of reaction, the presence of solvents or diluents is desirable. These preferably are polar solvents, able to dissolve the base, such as the dimethyl ether of diethylene glycol, alcohols such as ethanol, and so forth. Temperatures may range from above freezing to below the decomposition temperatures of reaction mixture components; a range of 50°–150° C. is generally suitable. Pressure may also vary over a wide range, such as from sub-atmospheric pressures of down to, say, 50 millimeters Hg, up to superatmospheric pressures of 1000 pounds per square inch or above. Generally, atmospheric pressures are suitable. It is usually desirable, however, to maintain a nitrogen atmosphere over the surface of the reaction mixtures to prevent access of air.

Generally, isolation of the amines of this invention is readily effected. It may be desirable to isolate the amine as a salt such as the hydrochloride salt. Practically any protonic acid can be used to form the acid addition salts, and useful acids, including physiologically acceptable acids such as hydrochloric and maleic, for forming salts of amines are well known in the art.

The (aralkylthio)alkylamino alkanols provided by this inevntion range from mobile liquids to crystalline solids. They are useful for a wide variety of industrial, pharmaceutical and agricultural applications. These benzylthio compounds are readily converted by debenzylation as set forth in copending application S.N. 176,409, filed concurrently herewith, by Robert J. Wineman, Morton H. Gollis, and John C. James, to the corresponding mercaptoalkylamino alkanols, which have demonstrated activity in protecting animals against the harmful effects of ionizing radiation. The aralkylthio compounds of the invention can also be desulfurized by treatment with Raney nickel, to provide alkylaminoalkanols and bis-(alkylamino)alkanols which may be employed as plasticizers for vinyl polymers such as polyvinyl chloride, stabilizers for polystyrene molding compositions, and as pharmaceuticals. The stated derivatives have advantageous properties as compared to corresponding primary alkanols because of their inclusion of an internally positioned hydroxylated carbon atom, making possible the biologically favorable asymmetric carbon atom configuration discussed above. The hydroxy group itself is of course also favorable in this connection because of its desirable effect of enhancing solubility and biological tolerance; and the alkanols which are polyols provided hereby are especially advantageous in this respect. Additionally, the presently provided compounds are intermediates for compounds other than alkanols; for example, the monohydric alkanol-mono-amines can be condensed with carbonyl compounds to provide sulfur-substituted oxazolidones having physiological activity, such as anticonvulsant activity. When these compounds are treated with a dehydrating agent such as phosphorous pentoxide, potassium bisulfate, sulfuric acid, aluminum oxide, and the like, the product is an olefin, which can be addition polymerized to form polymeric films useful as adherent protective surface-coatings or coherent pliable films useful for packaging and the like.

The various subclasses of the products of this invention, which comprise acyclic and cyclic, mono- and polyhydric, mono-amino and diamino alkanols, are also characterized by individual valuable properties: for example, the vic-diols of the invention may be used to form ketones by way of a pinacol rearrangement, and to chelate metals, as for pharmaceutical applications either where slow release thereof is desired or where the metal is to be removed from a system. The diaminoalkanediols which are tetradentate are especially valuable in the latter connection. The tertiary alkanols of the invention are characterized by resistance to oxidation. The presently provided alkanols may also be employed as rubber chemicals, for example as antioxidants or to produce cross-linking and vulcanization of rubbers and rubbery polymers; as agricultural toxicants, to produce repression and kill of undesirable organisms such as weeds, insects, fungi, bacteria, nematodes and the like; as physiological agents exerting pharmaceutical effects such as protection against the lethal and tissue damaging action of ionizing radiation; as surface-active and detergent agents; as petroleum additives, and so forth.

The invention is illustrated but not limited by the following examples, in which all parts are by weight unless otherwise noted.

*Example 1*

This example illustrates the formation of a 1-([2-(aralkylthio)alkyl]amino)-2-alkanol.

To a solution of 125 parts 2-(benzylthio)ethylamine in methanol is added, dropwise, about 40 parts of propylene oxide, to provide a molar ratio of these reactants of 1:1. During the addition of the propylene oxide, the solution of the amine is maintained under a blanket of nitrogen and rapidly stirred, while being held at a temperature of 45–50° C. After completion of the addition, the reaction mixture is heated for another half hour at this temperature, after which the solvent is removed by evaporation to leave a colorless oil. Using a Vigreux column, this oil is distilled, and the fraction boiling at about 146° C. column head temperature at 0.05 millimeter (mm.) is recovered. Elemental analysis gives values conforming to the analysis of 1-([2-(benzylthio)ethyl]amino)-2-propanol: found, N, 6.1%; calc. for $C_{12}H_{19}NOS$, N, 6.2%. Vapor pressure chromatography indicates the product has a purity of above 90%. The measured refractive index $n_D^{20}$ is 1.5537. The oily amine is converted to the hydrochloride by dissolving a sample of the oil in absolute ethanol, saturating the solution with dry HCl and adding anhydrous ether. The hydrochloride melts at 107–108° C. (uncorrected).

The assigned structure of the product is confirmed by preparation of the same compound from benzyl 2-chloroethyl sulfide and isopropanolamine. To effect this, about 185 parts of the sulfide and 75 parts of the amine are dissolved in ethanol with about 65 parts of sodium carbonate and refluxed under nitrogen for 18 hours. Solvent is removed, water is added, and concentrated HCl is then introduced to bring the mixture to an acid pH. The acidic mixture is extracted with ether and the resulting aqueous layer neutralized with 50% aqueous NaOH to form an oil which is extracted with ether. After drying over sodium sulfate, the ether is removed and the oil distilled. The fraction coming over at 133–135° C./0.13 mm. (column head temperature) is dissolved in ethanol, the solution is saturated with dry HCl, ether is added, and the mixture is chilled to precipitate the amine hydrochloride. After washing with ether, this salt melts at 107–108° C. (uncorr.), and the mixed melting point of this salt combined with the salt produced from the epoxide as described above is the same. The salts also have identical infrared spectra.

*Example 2*

This example describes the preparation of another aralkylthioalkylamino-sec-alkanol.

Following the procedure described in the preceding example, 43 parts of 1,2-epoxybutane are added to 100 parts of 2-(benzylthio)ethylamine in methanol. The oil residue remaining after evaporation off of the solvent is distilled and the fraction boiling at 146–147° C./0.07 mm. is collected. Elemental analysis is correct for 1-([2-(benzylthio)ethyl]amino)-2-butanol:

Calc. for $C_{13}H_{21}NOS$: C, 65.22%; H, 8.84%; N, 5.85%. Found: C, 65.4%; H, 8.8%; N, 5.9%.

The refractive index of the product, $n_D^{20}$, is 1.5448.

*Example 3*

This example describes the preparation of an (arylalkylthio)alkylamino alkanol wherein the alkanol has an internally positioned hydroxylated carbon atom and is branch-chained.

A solution of 250 parts of 2-(benzylthio)ethylamine in methanol is stirred under a blanket of nitrogen and maintained at about 60° C. while about 35 g. of 1,2-epoxyisobutane is added dropwise, slowly to provide a molar ratio of amine to epoxy compound of 3:1. After addition of the epoxide is complete, the reaction mixture is stirred for an additional half hour and then the solvent is evaporated off leaving an oily residue. This residue is distilled and the fraction boiling at a column head temperature of 125–127° C./0.04 mm. is collected. On cooling, it solidifies. The product melts at 53–56° C. Elemental analysis gives correct values for 1-([2-(benzylthio)ethyl]amino)-2-methyl-2-propanol:

Calc. for $C_{13}H_{21}NOS$: C, 65.22%; H, 8.84%; N, 5.85%; S, 13.40%. Found: C, 65.4%; H, 9.0%; N, 5.8%; S, 13.2%.

*Example 4*

This example illustrates preparation of a cyclic alkanol.

Following the procedure of the preceding example, about 50 parts of cyclohexene oxide is added dropwise to a solution of about 250 parts 2-(benzylthio)ethylamine in methanol, providing an amine:oxide molar ratio of 3:1, while the reaction mixture is maintained at 60° C. After heating for an additional short period of time, the solvent is evaporated. The oily residue is distilled. The cut boiling at 165–164° C./0.07 mm. (column head temperature) is collected. Purity of the product is corroborated by vapor phase chromatography. The assigned structure is corroborated by elemental analysis:

Calc. for $C_{15}H_{23}NOS$: C, 67.88%; H, 8.73%; N, 5.28%; S, 12.08%. Found: C, 68.0%; H, 8.6%; N, 5.3%; S, 12.3%.

The product is 2-([2-(benzylthio)ethyl]amino)cyclohexanol, M. 68–69° C.

*Example 5*

Following the procedure described in preceding examples, 25 parts of 1,2-epoxybutane are added dropwise to a solution of 150 parts of 3-(benzylthio)propylamine in methanol, to provide an amine:epoxy molar ratio of 2.5:1. On completion of the reaction, the solvent is removed and the residue distilled, to give about 54 parts of a fraction boiling at a column head temperature of 152–153° C./0.10 mm. This fraction, $n_D^{20}$ 1.5447, is 1-([3-(benzylthio)propyl]amino)-2-butanol.

*Example 6*

This example illustrates preparation of an (aralkylthio)alkylaminoalkanol from an arylalkyl haloalkyl sulfide and an amino alkanol.

A mixture of about 115 parts of 1-amino-2-propanol and about 20 parts of anhydrous sodium carbonate in absolute ethanol is stirred and refluxed while about 60 parts of benzyl 3-chloropropyl sulfide is added dropwise, over a period of an hour, to provide a ratio of sulfide to amine of 1 mole to 5. The reaction mixture is stirred and refluxed for 24 hours after the addition is completed, and then the reaction mixture is cooled to room temperature. The reaction mixture is filtered, and solvent is evaporated off, to leave a colorless oil. Unreacted amine is removed by distillation, leaving an oily residue, $n_D^{20}$ 1.5557. This is extracted with saturated salt solution and then acidified with 8 N HCl. The amine hydrochloride precipitates as a solid. The resulting slurry is washed with ether and filtered, and the solid residue is washed with more ether to give a white solid which can be recrystallized from methanol and ether to give a sample having a melting point of 130–131° C. The white solid hydrochloride is triturated with approximately 20% sodium hydroxide solution and the resulting oil is taken up in ether and washed with saturated salt solution. The ether layer is then dried overnight with anhydrous sodium sulfate, filtered and evaporated down, and the oily residue is dried at 45°/2 mm. to leave a colorless oil, $n_D^{20}$ 1.5510. This is 1-([3-(benzylthio)propyl]amino)-2-propanol. It has the correct elemental analysis:

Calc. for $C_{13}H_{21}NOS$: C, 65.2%; H, 8.8%; N, 5.9%; S, 13.4%. Found: C, 64.9%; H, 8.9%; N, 6.1%; S, 13.7%.

The observed molar refraction calculated from the observed $n_D^{20}$ value of 1.5510 and $d_4^{20}$ value of 1.062 is 71.92, and the theoretical value is 71.73. The infrared spectrum is also corroboratory of the assigned structure.

*Example 7*

This example illustrates the preparation of a polyfunctional [(aralkylthio)alkylamino]alkanol in accordance with the invention.

A solution of 230 parts of 2-(benzylthio)ethylamine in methanol is stirred and maintained at about 60° C. while about 20 parts of butadiene diepoxide is added dropwise, over a period of two and one-half hours, to provide an amine: epoxide molar ratio of 6.2 to 1. Heating and stirring are continued for ½ hour after addition of the epoxide is complete, and then solvent is removed to leave a residue which partially solidifies on standing. Addition of benzene precipitates a solid from the partially solidified mixture, which is separated and treated with ether on a Buchner funnel to dry it. The dry solid is recrystallized from a mixture of methanol and water (volume ratio 5:2). The infrared spectrum of this material is consistent with the assigned structure, 1,4-bis([2-benzylthio)ethyl]amino)-2,3-butanediol, as is the elemental analysis:

Calc. for $C_{22}H_{32}N_2O_2S_2$: C, 62.82%; H, 7.67%; N, 6.66%; S, 15.25%. Found: C, 63.3%; H, 7.3%; N, 6.7%; S, 15.4%.

The product has a melting point range of 91–109° C.; it is accordingly probably a mixture of stereo-isomers.

While the invention has been described with particular reference to various specific embodiments thereof, it will be appreciated that modifications and variations can be made without departing from the invention, which is limited only as defined in the appended claims.

What is claimed is:
1. (Aralkylthio)alkylaminoalkanols of the formula

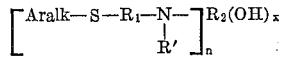

where
 each R is saturated aliphatic hydrocarbon,
 R' is selected from the group consisting of hydrogen and saturated aliphatic hydrocarbon,
 Aralk is an aralkyl hydrocarbon radical consisting of saturated aliphatic hydrocarbon substituted by a benzenoid ring,
 n is an integer of from 1 to 2,
 each said hydrocarbon radical contains up to 12 carbon atoms,
 x is an integer of from 1 to 3,
and at least one of the hydroxylated carbon atoms of the radical $R_2$ is internally positioned.

2. The compounds of claim 1 wherein the aralkyl radical is benzyl.
3. The compounds of claim 2 containing a single internally positioned hydroxylated carbon atom.
4. The compounds of claim 3 wherein said alkanol radical is acyclic.
5. 1-([2-(benzylthio)ethyl]amino)-2-propanol.
6. 1-([2-(benzylthio)ethyl]amino)-2-butanol.
7. 1-([3-(benzylthio)propyl]amino)-2-propanol.
8. The compounds of claim 3 wherein said alkanol is a cycloalkanol.
9. 2-([2-(benzylthio)ethyl]amino)cyclohexanol.
10. The compounds of claim 2 wherein said alkanol contains two internally positioned hydroxylated carbon atoms.
11. 1,3 - bis([2 - (benzylthio)ethyl]amino) - 2,3 - butanediol.

References Cited by the Examiner
UNITED STATES PATENTS
2,774,770  12/1956  Kerwin et al. _____ 260—570.5

CHARLES B. PARKER, *Primary Examiner.*
LEON ZITVER, *Examiner.*